Sept. 29, 1959 W. R. DRESSER 2,906,164
APPARATUS FOR INDICATING MATCH POINTS OF CAMERA FIELDS
Filed July 22, 1955 2 Sheets-Sheet 1
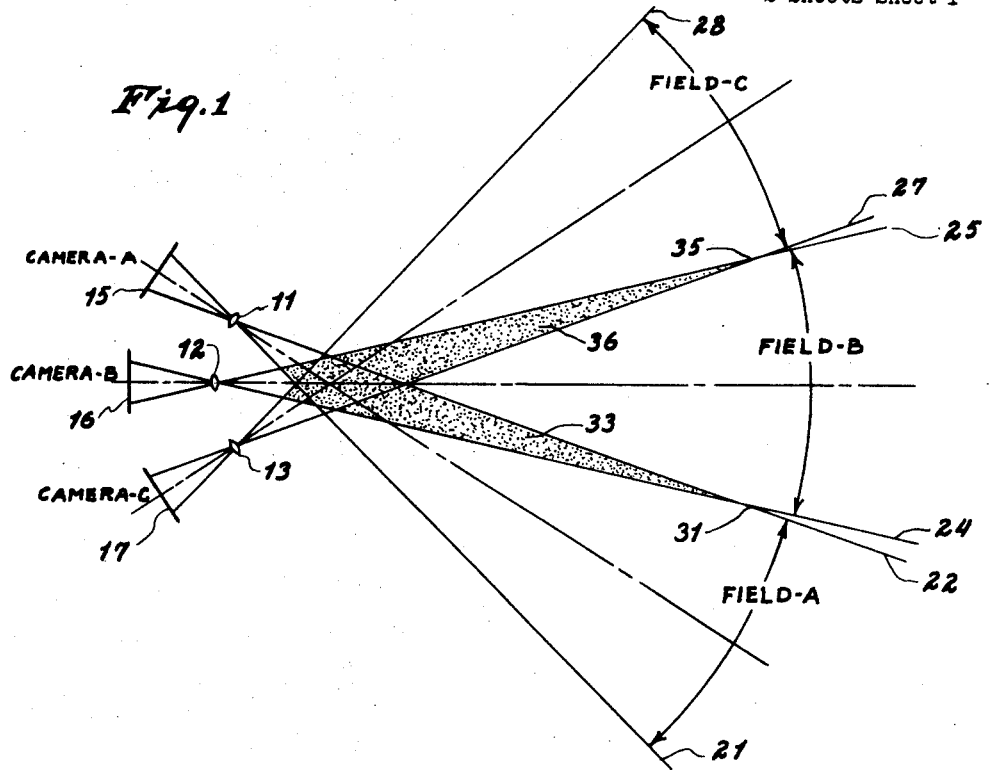
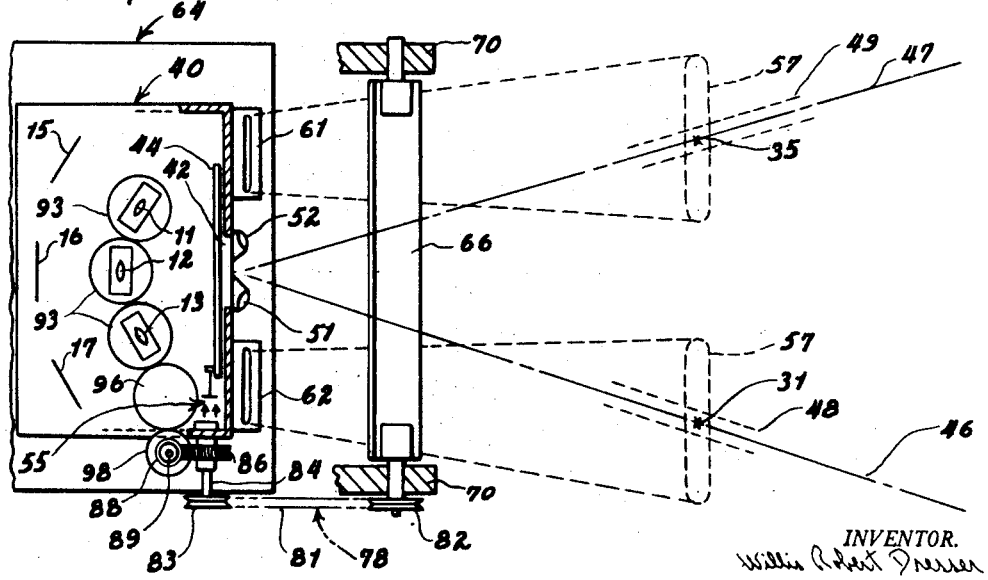
INVENTOR.
Willis Robert Dresser
BY Emery, Varney,
Whittemore & Dix
ATTORNEYS

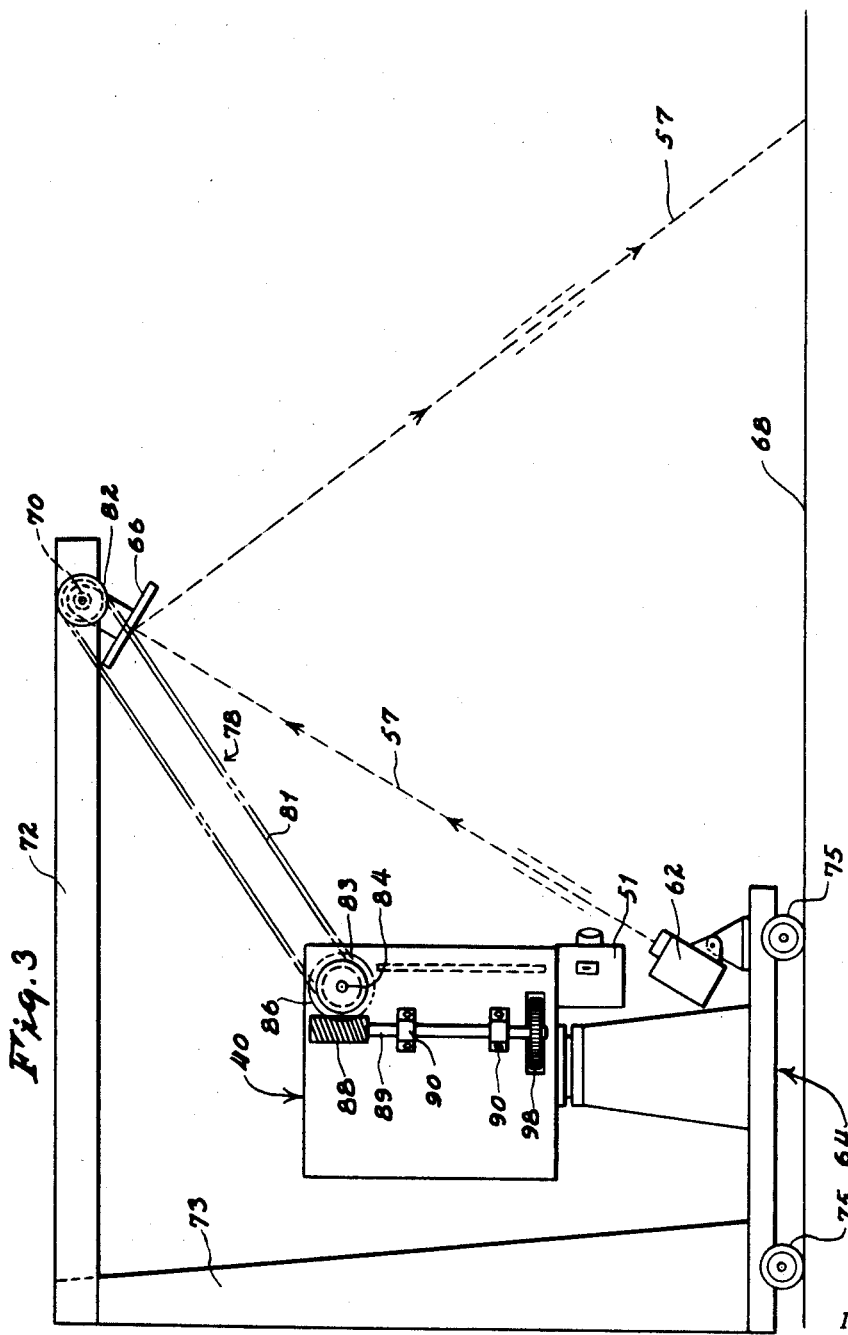

United States Patent Office 2,906,164
Patented Sept. 29, 1959

2,906,164

APPARATUS FOR INDICATING MATCH POINTS OF CAMERA FIELDS

Willis Robert Dresser, Long Hill, Conn., assignor, by mesne assignments, to The Prudential Insurance Company of America, a corporation of New Jersey Application July 22, 1955, Serial No. 523,881

4 Claims. (Cl. 88—16.6)

This invention relates to cameras and more especially to multilens cameras which are used for exposing different films which are projected to make a mosaic image.

Such cameras have their lenses close together but it is not possible to have the lenses coincident and some errors in the mosaic image result from the fact that the different lenses of the camera are spaced from one another. For example, the fields photographed by the differents lenses match one another exactly at only one distance from the camera. There is an overlapping of the lens fields at a closer distance to the camera and there is a gap between the fields at a greater distance. The point at which the fields match varies with the focus.

It is an object of this invention to provide means for indicating to the actors, director and camera man the actual location on the set at which the fields of the cameras are preferably matched. This enables the actors to move from one camera field to the other at the location where no mis-matching will occur in the projected images which show the movement between the different field areas.

Another object of the invention is to provide a combination of a match line indicator and a multilens camera which automatically changes the match line indication to correspond with changes in the focus of the camera.

Other objects, features and advantages of the invention will appear or be pointed out as the description proceeds.

In the drawing, forming a part hereof, in which like reference characters indicate corresponding parts in all the views;

Figure 1 is a diagrammatic plan view illustrating the way in which the fields of the different lenses, of a multilens camera, are related to one another;

Figure 2 is a diagrammatic, top plan view of a multilens camera and match line indicator made in accordance with this invention; and Figure 3 is a diagrammatic, side elevation of the combined camera and match line indicator illustrated in Figure 2.

Figure 1 shows a multilens camera having three lenses 11, 12 and 13. These lenses photograph images on films indicated by the reference characters 15, 16 and 17. The field photographed by the lens 11 extends between the lines 21 and 22. This field is designated by the dimension arrow and notation "Field A." The field photographed by the lens 12 extends between the lines 24 and 25 and is designated by the dimension arrow and notation "Field B." The lens 13 photographs a field extending between the lines 27 and 28 and designated by the dimension arrow and notation "Field C."

From Figure 1 it will be evident that Field A and Field B match at the point 31. At distances closer to the camera than the point 31, each of the lenses 11 and 12 photographs a part of the field of the other lens. This overlapping of the fields is represented by the stippled area 33. Beyond the point 31, the area between the lines 21 and 25 is not photographed by either of the lenses 11 or 12.

A person or object passing from Field A to Field B through the area 33 would be distorted in the mosaic picture by mis-matching of the edges of the picture; portions of the image being duplicated. Conversely, a person or object passing from Field A to Field B beyond the point 31 would partly disappear during the travel between the fields.

The Field B and the Field C match at the point 35. The fields overlap within the stippled area designated by the reference character 36; and objects between the lines 24 and 28, beyond the point 35, are not in either Field B or C.

Figure 2 shows a multilens camera 40 with the lenses 11, 12 and 13 in position to photograph their respective fields through an opening 42 commanded by a rotary shutter 44. No further description of the shutter or its operation is necessary for a complete understanding of this invention; but a more complete illustration of such a camera can be found in patent application of Fred Waller, Serial No. 330,065, filed Jan. 7, 1953.

The lines on which the match points of the different fields are located are indicated by the reference characters 46 and 47. These lines are not the limits of the field of the lens 12 except at the point where the fields of the different lenses match one another. Actually, lines 46 and 47 represent the lines along which the match points 31 and 35 of Figure 3 move as the focus of the camera changes.

In order to show the location of the lines 46 and 47 on the set, light beams 48 and 49 are projected on the floor or ground by light projectors 51 and 52. These light projectors are preferably located on the camera 40 and under the camera in the illustrated embodiment of the invention.

Since the light beams 48 and 49 are in the photographic field, when the camera is in position to photograph the ground or floor of the set, it is necessary to extinguish these light beams during the exposure period of the camera. This can be done in various ways, and in the construction illustrated there is a switch 55 operated by the shutter 44 to control the power supply of the light projectors 51 and 52 in such timed relation with the shutter 44 that the light beams are projected only when the shutter is closed.

The same principle is employed in the case of electronic cameras. Such cameras have a period during each cycle when the camera is "blind," and it is during this period that the light beams 48 and 49 are projected on the set. Apparatus for controlling the operation of the light projectors in accordance with the blind period of an electronic camera is disclosed in patent application Serial No. 423,562, filed April 16, 1954, and now U.S. Patent No. 2,816,475.

The location of the match points 31 and 35 is indicated by transverse light beams 57 which intersect the light beams 48 and 49. These light beams 57 may be a continuous band of light, and they may be straight or curved depending upon the construction of the light projecting equipment by which they are produced. The only significant parts of the light beams 57 are their regions of intersection with the light beams 48 and 49. Means are provided for shifting these transverse light beams 57 along the length of the lines 48 and 49 as the focus of the camera changes.

The apparatus is simplified by having the light beams 57 move toward and from the camera 40 without any component of movement transverse of the optical axis of the center lens. Thus, the movement of the light beams 57 does not cause them to diverge to compensate for the divergence of the light beams 48 and 49. However, the beams 57 are made long enough so that they will always intersect the beams 48 and 49 within the range of movement encountered in actual operation of the camera. The light beams 57 are projected from light projectors 61 and 62. These light projectors may be connected to the camera 40 or to a support 64 by which the camera 40 is carried. In the illustrated construction, the projectors 61 and 62 are secured to the camera support 64. The light projectors 61 and 62 have elongated lenses and they project their light beams 57 upwardly and forwardly to a reflector 66. From this reflector 66, the light beams 57 are directed downwardly to the floor or ground 68.

The reflector 66 is supported in bearings 70 secured to a boom 72 extending from a mast 73 carried by the same support 64 to which the camera 40 is connected. There are wheels 75 under the support 64 for moving it to different locations; and since the light projectors 62 and reflector 66 are carried by this same support 64, they remain in the same relationship with one another regardless of changes in the location of the camera on the set.

In order to change the location at which the light beams 57 strike the floor or ground 68, when the focus of the camera is changed, the reflector 66 is free to turn in the bearings 70. The angular position of the reflector 66 is controlled by a connection 78 leading from the reflector 66 to the camera.

This connection 78, in the construction illustrated, comprises a belt 81 which passes around a pulley 82 which is attached to the reflector 66 and coaxial therewith. The connection 78 also includes another pulley 83 rotatable about an axle 84 carried by the camera 40.

A worm wheel 86 is connected with the pulley 83 and is rotated by a worm 88 at the upper end of a shaft 89 which turns in bearings 90 on the camera.

The lenses 11, 12 and 13 are focused by rotating gears 93 which mesh with one another to obtain aqual movement of the lenses during focusing. These gears 93 operate motion transmitting connections to the mounts of the lenses. The detailed construction of the focusing mechanism is not necessary for a complete understanding of this invention. Suitable mechanism is shown in Patent No. 2,583,030, issued January 22, 1952; but other lens focusing mechanism can be used.

One of the gears 93 mashes with an idler gear 96 which transmits motion of the focusing gears 93 to a gear 98 at the lower end of the shaft 89. Thus, motion of the focusing gears 93 is transmitted through the shaft 89 and through the worm gearing and belt and pulleys to the reflector 66 to shift the light beam 57 in accordance with changes in the focus of the camera.

The preferred embodiment of the invention has been illustrated and described, but changes and modifications can be made and some features can be used in different combinations without departing from the invention as defined in the claims.

What is claimed is:

1. The combination of a multilens camera assembly with different lenses transversely spaced from one another but oriented to image fields that are contiguous for subsequent projection as a mosaic picture, said fields having their adjacent edges coincident at one and only one match point, which point is at a distance from the camera lenses, the distance being variable with change of focus of the camera lenses, two projectors for indicating light beams, means supporting each of the projectors at a predetermined location with respect to the camera assembly, one of said projectors facing in a direction to project a light beam along a line along which the match point moves with change of focus of the camera lenses, and the other of which is in position to project its light beam along a path which intersects the light beam from the first projector at the match point of the image fields of the different lenses at which point mismatching is avoided when an object passes from one image field to an adjacent image field, mechanism for changing the focus of the camera assembly, means for moving at least a part of the second light projector to change the location of the intersection of the light beams lengthwise of the light beam from the first projector, and actuating connections between the mechanism for changing the focus and the means for moving at least a part of the second light projector.

2. The combination described in claim 1 and in which there is a movable support for the camera assembly, and the projectors are carried by the same support that carries the camera assembly.

3. The combination described in claim 1 and in which the lenses of the camera assembly include three lenses, of which one is a middle lens and the others are side lenses, and there are similar light beam projectors for indicating the match points of the field of the middle lens and the fields of both of the side lenses.

4. The combination of a camera with different lenses transversely spaced from one another but oriented to image contiguous fields for projection as a mosaic picture, two light projector devices supported in a certain position with respect to the camera and one of which projectors faces in a direction to project a beam longitudinally along the line on which the match point of the lens fields moves with change of focus of the camera and the other of which projects a beam transverse of the first beam and in a direction to intersect the first beam at the match point, mechanism for changing the focus of the camera, means for moving at least a part of the second light projector device to change the point of intersection of the light beams lengthwise of the light beam from the first projector device, said means being operated by the mechanism that changes the focus of the camera, the second light projector device including a light projector in position to throw a beam upwardly and forwardly from a location adjacent to the camera, a reflector in the path of the upwardly directed beam, bearing means on which the reflector is movable about an axis extending transversely of the beam which is directed upwardly and also transversely of the beam of the first light projector device, the reflector being elongated in the general direction of its axis of rotation so as to reflect a line of light having a substantial length transverse of the beam from the first projector device, and motion-transmitting connections leading from the reflector to the mechanism that changes the focus of the camera for transmitting motion of that mechanism to the reflector.

References Cited in the file of this patent

UNITED STATES PATENTS

| | | |
|---|---|---|
| 1,136,236 | Killman | Apr. 20, 1915 |
| 2,282,045 | Fleischer | May 5, 1942 |
| 2,339,780 | Huitt | Jan. 25, 1944 |
| 2,379,698 | Fischer | July 3, 1945 |
| 2,388,714 | Schwartz et al. | Nov. 13, 1945 |
| 2,441,877 | Flett | May 18, 1948 |
| 2,581,300 | Rossman et al. | Jan. 1, 1952 |
| 2,601,086 | Bucky | June 17, 1952 |